US008661534B2

(12) United States Patent
Chatterjee et al.

(10) Patent No.: US 8,661,534 B2
(45) Date of Patent: Feb. 25, 2014

(54) SECURITY SYSTEM WITH COMPLIANCE CHECKING AND REMEDIATION

(75) Inventors: Arindam Chatterjee, Redmond, WA (US); Anders Samuelsson, Redmond, WA (US); Nils Dussart, Redmond, WA (US); Charles G. Jeffries, Sammamish, WA (US); Amit R. Kulkarni, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1187 days.

(21) Appl. No.: 11/768,596

(22) Filed: Jun. 26, 2007

(65) Prior Publication Data

US 2009/0007264 A1    Jan. 1, 2009

(51) Int. Cl.
*H04L 29/06* (2006.01)

(52) U.S. Cl.
USPC .................. 726/22; 726/1; 726/25; 713/166

(58) Field of Classification Search
USPC ...................................................... 726/1, 22
See application file for complete search history.

(56) References Cited

U.S. PATENT DOCUMENTS

| 6,584,568 | B1 | 6/2003 | Dircks et al. |
| 6,980,927 | B2 | 12/2005 | Tracy et al. |
| 7,162,649 | B1 | 1/2007 | Ide et al. |
| 7,592,906 | B1 * | 9/2009 | Hanna et al. ................. 340/506 |
| 2003/0056116 | A1 | 3/2003 | Bunker et al. |
| 2004/0193907 | A1 | 9/2004 | Patanella |
| 2004/0193912 | A1 * | 9/2004 | Li et al. ......................... 713/200 |
| 2005/0132225 | A1 | 6/2005 | Gearhart |
| 2005/0229256 | A2 | 10/2005 | Banzhof |
| 2005/0257267 | A1 | 11/2005 | Williams et al. |
| 2006/0005019 | A1 * | 1/2006 | Chao ............................. 713/166 |
| 2006/0080656 | A1 * | 4/2006 | Cain et al. ..................... 717/174 |
| 2006/0101520 | A1 | 5/2006 | Schumaker et al. |
| 2006/0195905 | A1 * | 8/2006 | Fudge ............................. 726/25 |
| 2006/0259972 | A2 | 11/2006 | Oliphant |
| 2006/0265746 | A1 | 11/2006 | Farley et al. |
| 2008/0005285 | A1 * | 1/2008 | Robinson et al. ............. 709/220 |

OTHER PUBLICATIONS

Gorge, "Making sense of log management for security purposes—an approach to best practice log collection, analysis and management", May 2007, Computer Fraud & Security, pp. 5-10.*
Bertino, Elisa et al., "Securing XML Documents with Author-x," IEEE Internet Computing, vol. 5., No. 3, May/Jun. 2001 (11 pages).

(Continued)

*Primary Examiner* — Taghi Arani
*Assistant Examiner* — Thaddeus Plecha
(74) *Attorney, Agent, or Firm* — Tony Azure; Andrew Sanders; Micky Minhas (57) ABSTRACT

A security system is provided for use with computer systems. In various embodiments, the security system can analyze the state of security of one or more computer systems to determine whether the computer systems comply with expressed security policies and to remediate the computer systems so that they conform with the expressed security policies. In various embodiments, the security system can receive compliance documents, determine whether one or more computer systems comply with portions of security policies specified in the compliance documents, and take actions specified in the compliance documents to cause the computer systems to comply with the specified security policies. The security system may provide a common, unified programming interface that applications or tools can employ to verify or enforce security policies.

18 Claims, 9 Drawing Sheets

(56) References Cited

OTHER PUBLICATIONS

Winslett, et al., "Negotiating Trust on the Web," IEEE Internet Computing, Nov./Dec. 2002 (8 pages).

Kudo, Michiharu and Hada, Satoshi, "XML Document Security Based on Provisional Authorization," CCS '00, Athens, Greece, Copyright 2000 ACM (10 pages).

* cited by examiner

SECURITY SYSTEM WITH COMPLIANCE CHECKING AND REMEDIATION

BACKGROUND

Computers have become targets for various types of sophisticated electronic attacks and misuse, such as viruses, "spyware," "Trojan horses," denial of service, misuse of business computing resources, misappropriation of data, electronic trespass, "SPAM," and so forth. Electronic attacks typically target one or more operating system (OS) components, such as OS subsystems, applications, device drivers, services, registries, user accounts, or other resources associated with computer systems.

System administrators may also require computer systems they administer to comply with other requirements, such as requirements imposed by privacy or corporate governance laws. As an example, system administrators may require computer systems to have the latest software patches.

In response to the increasing number of attacks and other requirements, businesses and individuals have adopted various security policies to shield their computers. The security policies may specify software requirements, such as virus protection software, firewall software, monitoring software, SPAM-filtering software, and other security software products; procedures, such as periodic password reset and file system access permissions; and other security-related measures. Although system administrators install, configure, and manage security software products in compliance with security policies, the computer systems they administer may lose compliance when a security policy changes or when a security software product's configuration changes. The computer systems may also no longer be compliant when procedures are not diligently followed, such as when passwords are not reset, files are accessible by more user accounts than the policy permits, malicious code is installed inadvertently and so forth.

In large organizations, system administrators may need to ensure that server computers, desktop computers, handheld computers, and other computer systems comply with various security policies, such as by checking compliance and enforcing security policies regularly. As examples, the system administrators may need to ensure that (1) servers and other computer systems have been updated with the latest "service packs" or other updates; (2) users have access to only files or folders consistent with security policies; (3) user accounts and passwords are managed in a manner that is consistent with relevant security policies, and so forth. System administrators may be responsible for hundreds or even thousands of computer systems. When this is the case, enforcing security policies can be difficult, time-consuming, and even error-prone.

SUMMARY

A security system is provided for checking and enforcing compliance with security policies. The security system can analyze the state of security of one or more computer systems to determine whether the computer systems comply with expressed security policies and to remediate the computer systems so that they conform with the expressed security policies. The security system enables a person to generate a compliance document that specifies (1) checks to be performed to determine whether a computer system complies with a security policy and (2) remedial actions to return the computer system to compliance. The security system can receive compliance documents, determine whether one or more computer systems comply with portions of security policies specified in the compliance documents, and take actions specified in the compliance documents to cause the computer systems to comply with the specified security policies. A compliance document can identify portions of security policies, such as by identifying operating system (OS) components and "state information" relating to the OS components, and may additionally indicate a remediation action that the security system can undertake to cause the OS component to be compliant with the security policies. A remediation action may relate to OS components other than the OS component that the security system has determined is not compliant. The security system may provide a common, unified programming interface that applications or tools can employ to verify or enforce security policies.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A security system is provided for checking and enforcing compliance with security policies. In various embodiments, the security system can analyze the state of security of one or more computer systems to determine whether the computer systems comply with expressed security policies and to remediate the computer systems so that they conform with the expressed security policies. The security system enables a person to generate a compliance document that specifies (1) checks to be performed to determine whether a computer system complies with a security policy and (2) remedial actions to return the computer system to compliance. For example, a compliance document can specify to check whether a certain version of antivirus software is currently executing on the computer system and if not, specify the remedial action of starting the execution of the software. The compliance documents may be created by a system administrator of an organization or by third-party providers of security services. The security system may be scheduled to process compliance documents at various times. For example, the security system may be scheduled to process antivirus related compliance documents on a daily basis and anti-spam related compliance documents on a weekly basis. When the security system processes a compliance document, it may take a remedial action when the computer system does not comply. The security system can receive compliance documents, determine whether one or more computer systems comply with portions of security policies the compliance documents specify, and take remediation actions the compliance documents may specify to cause the computer systems to comply with the specified security policies. A compliance document can identify portions of security policies, such as by identifying operating system (OS) components and "state information" relating to the OS components. State information can include configuration states, operation states, performance states, or other attributes of the OS components. A compliance document may additionally indicate a remediation action that the security system can undertake to cause the OS component to be compliant with the security policies. A remediation action may relate to OS components other than the OS component that the security system has determined is not compliant. As an example, when an update to a firewall component is not installed, configured, or operating correctly, the security system may disable one or more OS components, such as an Internet service. The security system can take this action to protect the user or computer until the update can be installed.

In various embodiments, the security system includes a provider interface that compliance applications can employ to interact with OS components, such as to determine whether the OS components comply with one or more security policies. A compliance application is an application that a user, such as a system administrator, may employ to create or provide compliance documents, determine whether one or more computer systems comply with security policies specified in the compliance documents, and otherwise interact with the security system. The provider interface may provide an application program interface (API) that components of the security system may employ, such as to interact with other components. The API may be employed by OS components, applications, tools, and other software so that the software does not need to interact with each OS component separately. Thus, an application developer that employs the provider interface component's API may not need to learn and employ interfaces provided by different OS components to check compliance or cause remediation. Moreover, providing a common API enables system administrators to employ stronger security measures with operating systems they administer because they may not need to administer many OS components separately. System administrators can provide increased privileges to some OS components and reduced privileges to user accounts under which compliance applications execute, as described in further detail below.

In some embodiments, the provider interface may employ APIs provided by various providers to interact with OS components. Examples of providers include a registry provider, a file system provider, a services provider, a firewall provider, and so forth. Each provider may be associated with one or more OS components and can interact with the associated OS components, such as to determine or affect state information. As an example, a file system provider may interact with a file system, e.g., to (1) determine which user accounts have access to various files or folders, (2) set permissions, (3) move or delete files, and so forth.

In various embodiments, the security system can receive compliance documents in various formats, such as a native format supported by the security system or a standard format, such as an Extensible Configuration Checklist Description Format (XCCDF). One or more of these formats may be specified using a human-readable language, such as Extensible Markup Language (XML). Documents specified using XCCDF may include checklists, benchmarks, and configuration information. XCCDF and other similar standards assist security administrators to configure computer systems to comply with security and regulatory compliance requirements. The security system can "consume" these documents and convert them into a native format that can be employed to automatically determine whether a computer system complies with various security policies specified therein and to configure OS components accordingly.

In various embodiments of the security system, some components may operate with high security privileges, such as with an administrative user account, whereas other components may operate with lower security privileges, such as with the privileges of the user that invokes an application that employs the provider interface. As an example, when a user invokes a compliance application, the compliance application may operate with the user's access rights. Users generally cannot access various aspects of an operating system when the operating system has been properly secured, such as device drivers or application files. When the compliance application executes in a properly secured operating environment, it may only receive the user's rights. However, the provider interface component and providers that handle requests from the compliance application may nevertheless operate with higher security privileges, such as with an administrative account, so that the security system can interact with OS components to handle the requests, check compliance, handle remediation actions, and so forth.

Thus, the security system can analyze the state of security of one or more computer systems to determine whether the computer systems comply with expressed security policies and to remediate the computer systems so that they conform with the expressed security policies. The security system thereby automatically enforces security policies easily, accurately, and in a timely manner.

Figure 1:
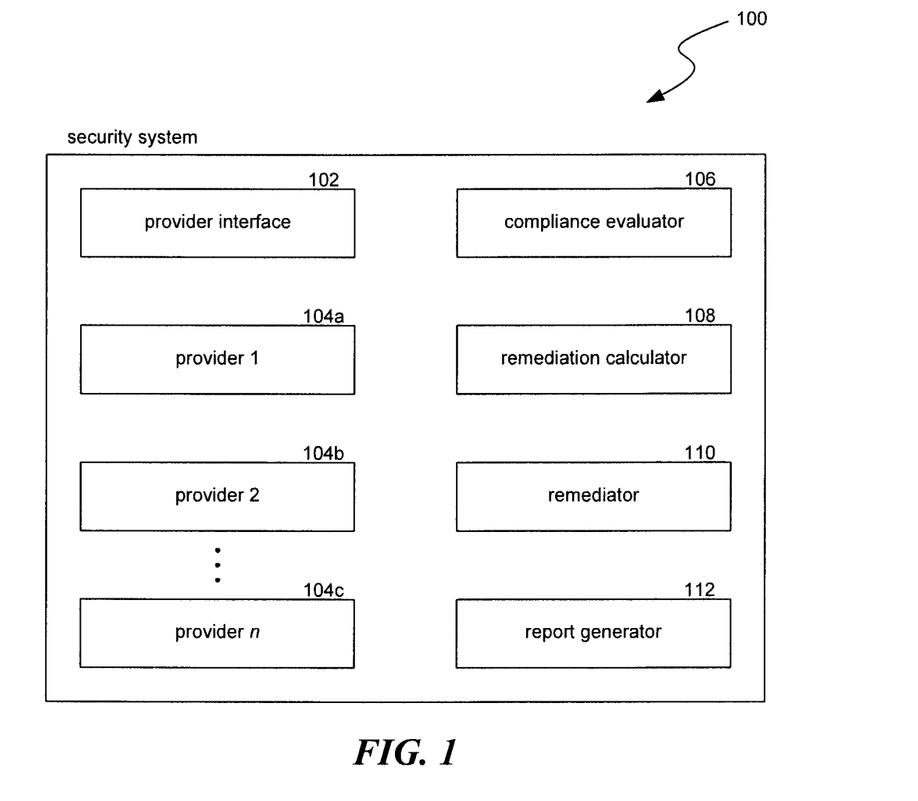
FIG. 1 is a block diagram illustrating components associated with a security system in various embodiments.

The security system will now be described with reference to the figures. FIG. 1 is a block diagram illustrating components associated with a security system in various embodiments. The security system 100 includes a provider interface component 102; multiple provider components associated with OS components, such as provider 1 104a, provider 2 104b, and provider "n" 104c; a compliance evaluator component 106; a remediation calculator component 108; a remediator component 110; and a report generator component 112. The provider interface component 102 may provide an API that applications, components of the security system, or OS components can employ to interact with the security system. As an example, a compliance application may interact with the security system via the API provided by the provider interface component 102. Each provider component 104a-104c interacts and is associated with other components of an OS, such as subsystems. Examples of provider components include a provider component associated with a registry of the OS, a provider component associated with a file system of the OS, a provider component associated with a firewall, and so forth. The provider components may provide an API that the provider interface component can employ to interact with the provider components. Based on these interactions, a provider component can take various actions in relation to the OS components with which the provider component is associated. As an example, a compliance application may interact via a provider interface with a provider component associated with an OS registry to check registry compliance or to undertake remediation actions. The compliance evaluator component 106 can receive compliance documents and cause the production of compliance reports, such as after interacting with the provider interface to determine whether OS components indicated by the compliance document comply with various security policies. The remediation calculator component 108 can identify a set of remediation actions associated with various OS components, such as to cause the security system to bring the computer system into compliance with the compliance document. The remediator component 110 may consume the remediation actions identified by the remediation calculator and invoke provider components via the provider interface, such as to bring an OS component into compliance with the security policy indicated by the compliance document. The remediator component may undertake a remediation action or cause another component to undertake a remediation action. The report generator component 112 can produce various reports and change logs, such as based on compliance reports produced by the compliance evaluator component or remediation results identified by the remediator component. The reports and change logs may be generated based on compliance checks and remediation actions performed by different provider components and operating system components. A provider component can cause an operating system with which it is associated to undergo a remediation action, such as to bring it into compliance with a compliance criterion that is specified in a compliance document.

The computing devices on which the security system operates may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the security system. In addition, the data structures and message structures may be stored or transmitted via a data transmission medium, such as a signal on a communications link. Various communications links may be employed, such as the Internet, a local area network, a wide area network, or a point-to-point dial-up connection.

The security system may use various computing systems or devices, including personal computers, server computers, hand-held or laptop devices, multiprocessor systems, microprocessor-based systems, programmable consumer electronics, electronic game consoles, network PCs, minicomputers, mainframe computers, distributed computing environments that include any of the above systems or devices, and the like. The security system may also provide its services to various computing systems, such as personal computers, cell phones, personal digital assistants, consumer electronics, home automation devices, and so on.

The security system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
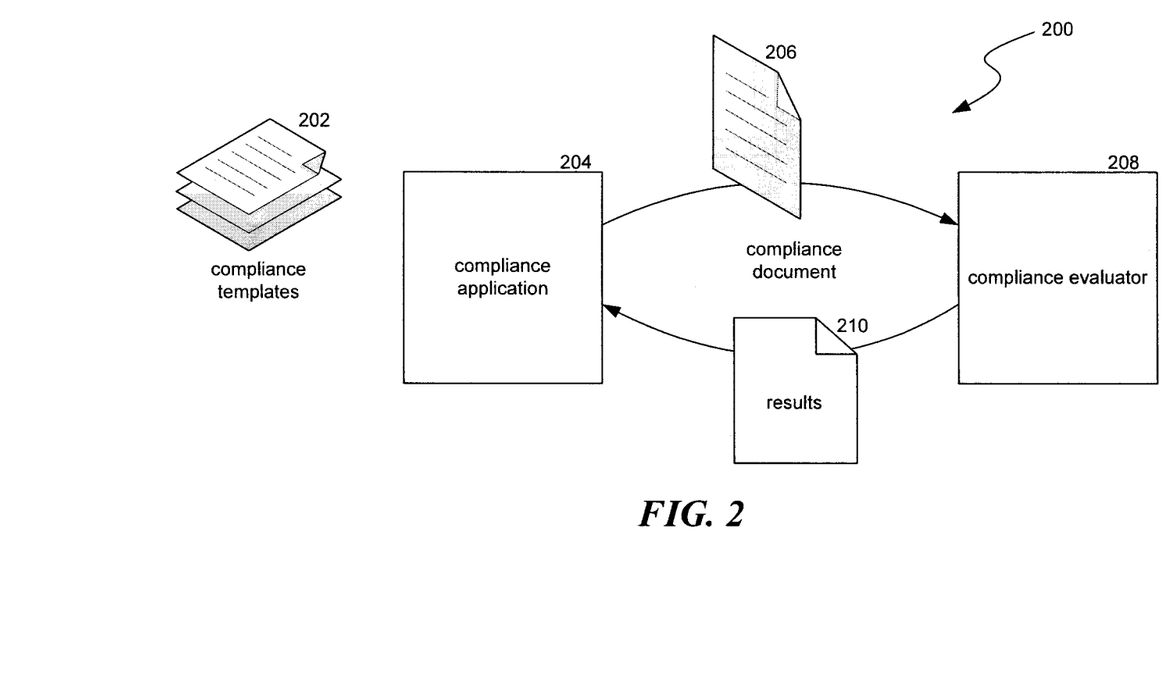
FIG. 2 is a block diagram illustrating how security compliance can be determined using the security system in some embodiments.

FIG. 2 is a block diagram illustrating how security compliance can be determined using the security system in some embodiments. The security system 200 includes various components that produce results based on compliance checks and remediation actions. The security system may employ one or more compliance templates 202. A compliance template can be a collection of compliance documents. A compliance application 204 can receive one or more compliance templates and may produce one or more compliance documents 206. The compliance application may then provide the compliance documents to a compliance evaluator component 208. The compliance evaluator component may then employ the API provided by the provider interface to interact with provider components indicated by the compliance documents. The compliance evaluator may then provide results 210 to the compliance application 204. As an example, the compliance evaluator may produce an intermediate compliance report that indicates which compliance criteria specified in compliance documents are not satisfied. The security system may employ a report generator component that employs the intermediate compliance report to produce a compliance report that the compliance application employs, such as to produce a report for a user. In some embodiments, the compliance report can be provided to the user directly.

Figure 3:
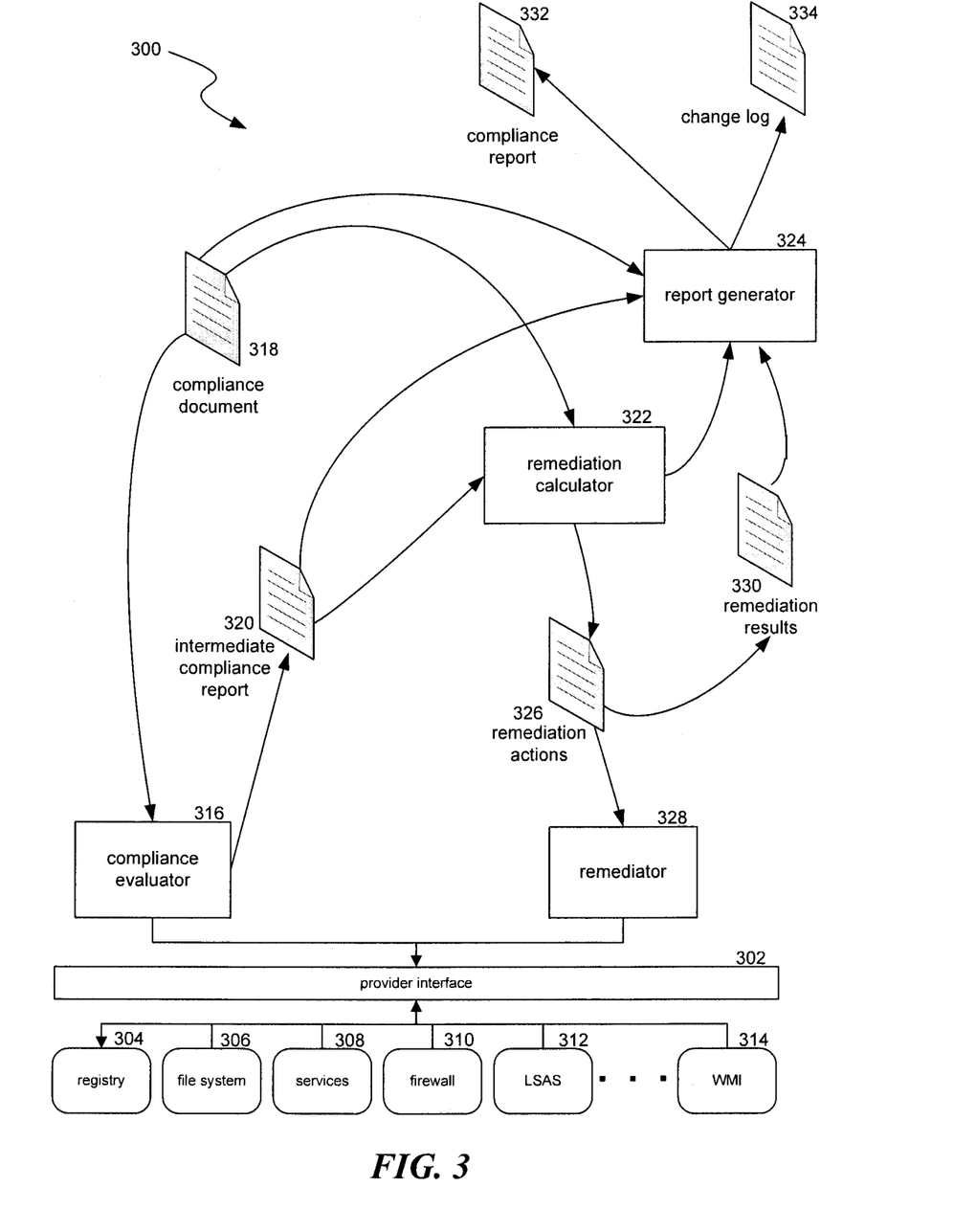
FIG. 3 is a block diagram illustrating operation of the security system in some embodiments.

FIG. 3 is a block diagram illustrating operation of the security system 300 in some embodiments. As described above, a provider interface component 302 can interact with one or more provider components, such as a registry provider component 304, a file system provider component 306, a services provider component 308, a firewall provider component 310, a Windows security provider component (LSAS) 312, an instrumentation provider component (WMI) 314, and so forth. A compliance evaluator component 316 may interact with the provider interface component 302. As an example, the compliance evaluator component may receive a compliance document 318 and interact with the provider interface component to request one or more providers indicated by the compliance document to determine whether OS components associated with the providers comply with portions of security policies indicated by the compliance document. The compliance evaluator component may then generate an intermediate compliance report 320. The intermediate compliance report may list the results each provider component reports. A remediation calculator component 322 and/or a report generator component 324 may employ that intermediate compliance report to produce reports. The remediation calculator component can employ the intermediate compliance report 320 and the compliance document 322 to generate a set of remediation actions 326. The remediation actions may indicate what actions various providers need to undertake to bring the computer system into compliance with portions of the security policies indicated by the compliance document. A remediator component 328 may employ the remediation actions to interact via the provider interface with one or more provider components to cause OS components to comply with security policies. The remediator component 328 may produce remediation results 330 that indicate whether or not the remediation actions were successfully applied. The report generator component 324 employs the compliance document 318, remediation actions 326, and remediation results 330 to produce a compliance report 332 and a change log 334. The compliance report 332 can be provided to various applications, e.g., compliance applications, such as to produce results that a system administrator can analyze. The compliance report may be in a human-readable format. The change log 334 can indicate what changes the security system made based on the compliance document 318. As an example, the change log may be added to a system event log.

Figure 4:
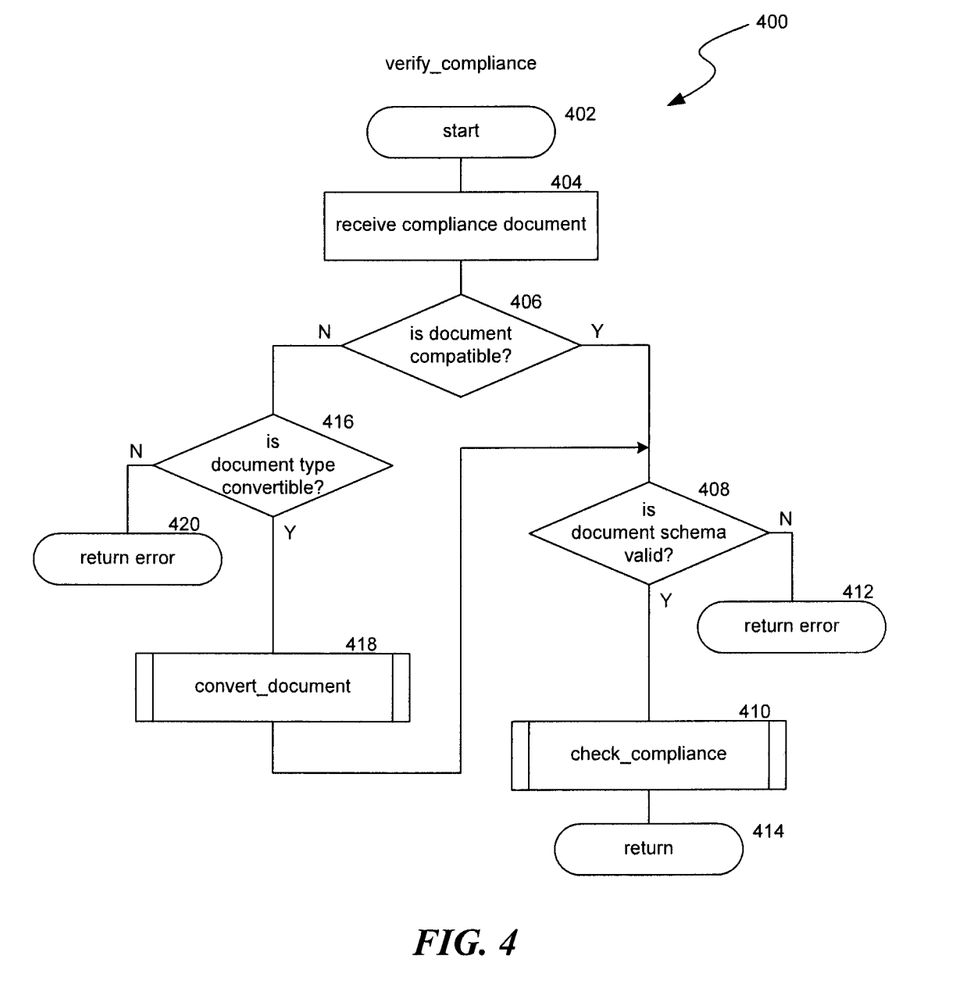
FIG. 4 is a flow diagram illustrating a verify_compliance routine invoked by the security system in some embodiments.

FIG. 4 is a flow diagram illustrating a verify_compliance routine invoked by the security system in some embodiments. The routine 400 may be invoked by an application, such as a compliance application. The routine begins at block 402. At block 404, the routine receives a compliance document. The compliance document can be created by an administrator, such as by employing a compliance application, or can be produced automatically, such as by a system administration tool. At decision block 406, the routine determines whether the document is compatible with the security system. As an example, the security system may support a native document format. When the document is compatible, the routine continues at decision block 408.

At decision block 408, the routine determines whether a document schema associated with the compliance document is valid. If the document schema is valid, the routine continues at block 410. Otherwise, the routine returns an error at block 412. At block 410, the routine invokes a check_compliance subroutine to determine whether the computer system complies with portions of security policies indicated by the compliance document. The check_compliance subroutine is described in further detail below in relation to FIG. 6. The routine then returns at block 414.

At decision block 416, the routine determines whether the received compliance document can be converted. As an example, the security system may receive an XCCDF document and can convert the XCCDF document to a native document format. If the document can be converted, the routine continues at block 418. Otherwise, the routine returns an error at block 420. At block 418, the routine invokes a convert_document subroutine to convert the received document. The convert_document subroutine is described in further detail below in relation to FIG. 5. The routine then continues at division block 408.

Those skilled in the art will appreciate that the logic illustrated in FIG. 4 and described above, and in each of the flow diagrams discussed below, may be altered in various ways. For example, the order of the logic may be rearranged, substeps may be performed in parallel, illustrated logic may be omitted, other logic may be included, etc.

Figure 5:
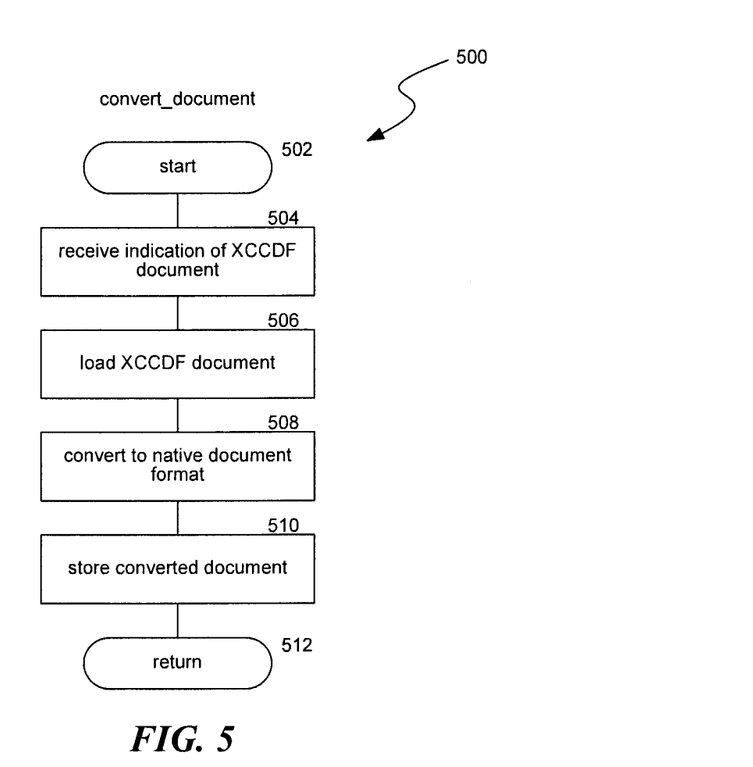
FIG. 5 is a flow diagram illustrating a convert_document routine invoked by the security system in some embodiments.

FIG. 5 is a flow diagram illustrating a convert_document routine invoked by the security system in some embodiments. The routine 500 begins at block 502. At block 504, the routine receives an indication of an XCCDF document. In various embodiments, the routine may receive indications of other types of documents. The indication can be a location from which the file can be loaded. At block 506, the routine loads the XCCDF document. As an example, the routine may load the document from the location indicated at block 504. At block 508, the routine converts the loaded XCCDF document to a native document format. As an example, the routine may employ a transformation indicated in XML to transform the XCCDF document to a native document format. At block 510, the routine stores the converted document. In various embodiments, the routine may provide an indication of the stored document to the routine that invoked the convert_document routine. The routine returns at block 512.

Figure 6:
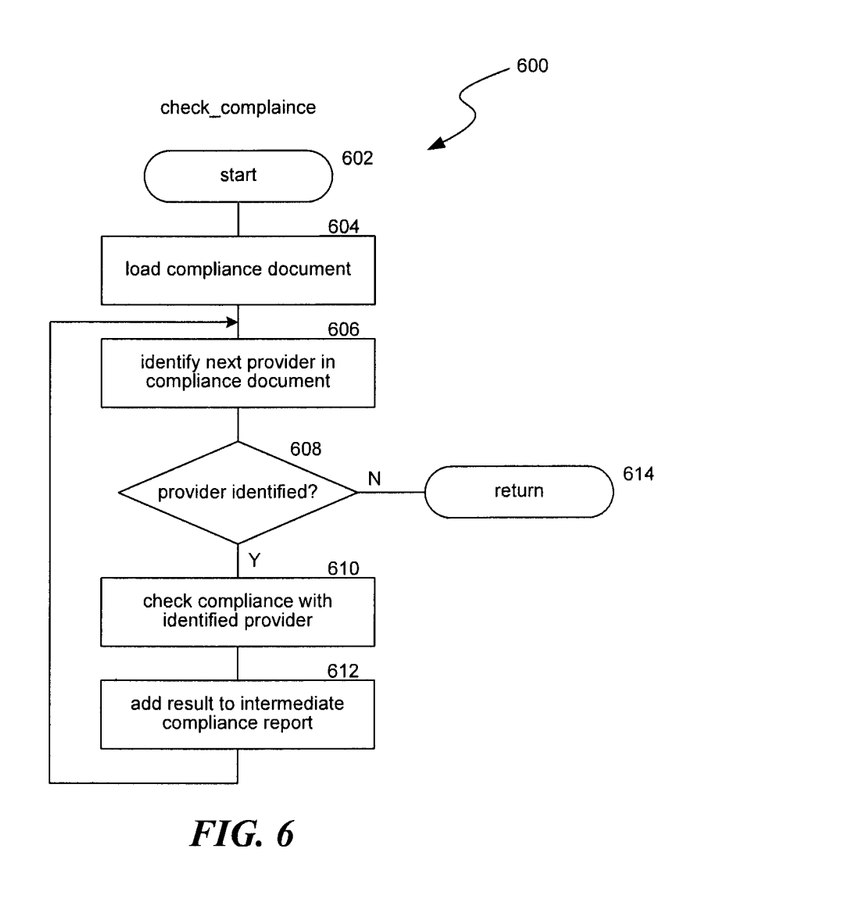
FIG. 6 is a flow diagram illustrating a check_compliance routine invoked by the security system in some embodiments.

FIG. 6 is a flow diagram illustrating a check_compliance routine invoked by the security system in some embodiments. The routine 600 begins at block 602. At block 604, the routine loads a compliance document. At block 606, the routine identifies the next provider indicated by the compliance document. At decision block 608, the routine determines whether a provider could be identified at block 606. As an example, when all indicated providers have been processed, a provider may not be identifiable. If no provider could be identified, the routine continues at block 614, where it returns. Otherwise, if a provider was identified, the routine continues at block 610. At block 610, the routine determines whether the OS component associated with the identified provider is in compliance with security policies indicated by the loaded compliance document. At block 612, the routine adds results generated by the identified provider to an intermediate compliance report. The routine then continues at block 606.

Figure 7:
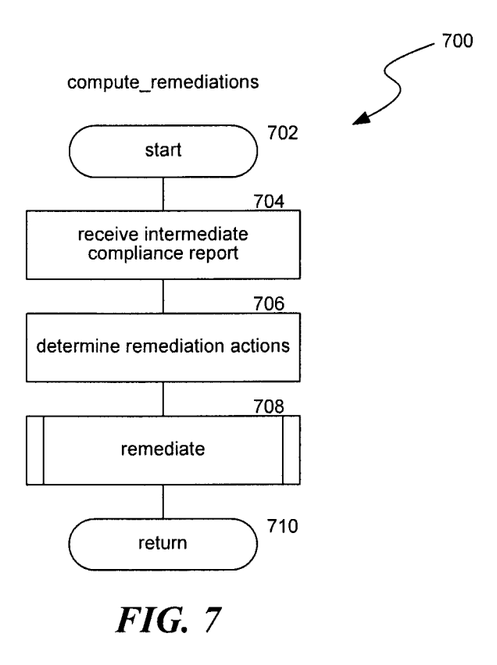
FIG. 7 is a flow diagram illustrating a compute_remediations routine invoked by the security system in some embodiments.

FIG. 7 is a flow diagram illustrating a compute_remediations routine invoked by the security system in some embodiments. The routine 700 may be invoked by a remediation calculator component. The routine begins at block 702. At block 704, the routine receives an intermediate compliance report. As an example, the routine may receive an intermediate compliance report that is produced by a compliance evaluator. At block 706, the routine determines remediation actions based on the compliance report. As an example, the compliance document may indicate what remediation actions to undertake when a provider indicates that an OS component with which the provider is associated is not in compliance. At block 708, the routine invokes a remediate subroutine to bring the computer system into compliance with the portions of the security policies indicated by a compliance document. The remediate subroutine is described in further detail below in relation to FIG. 8. The routine then returns at block 710.

Figure 8:
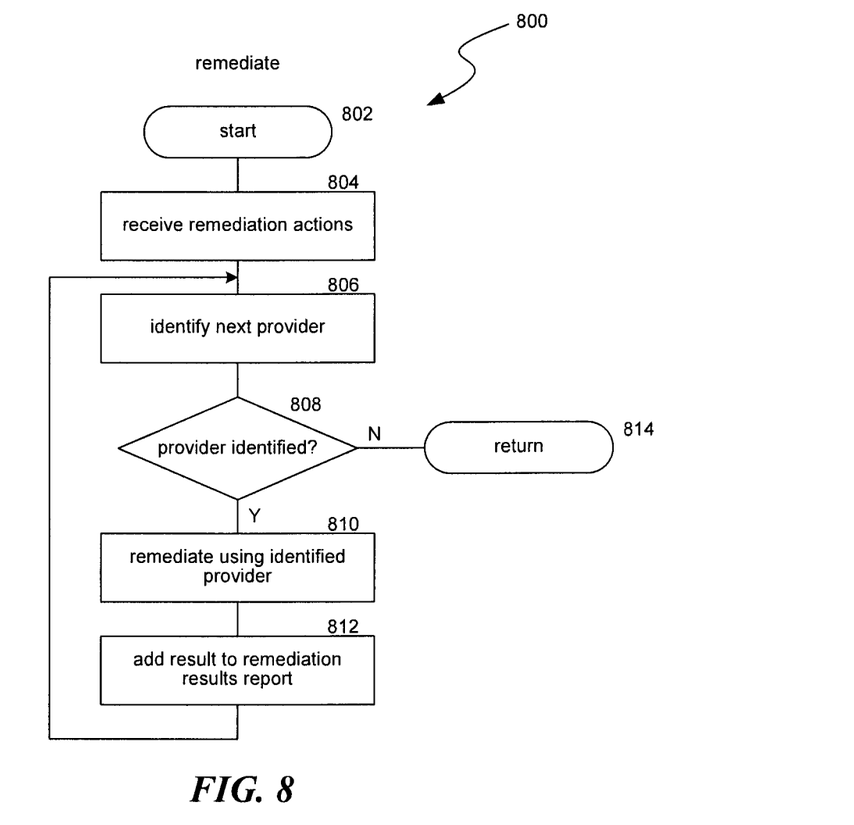
FIG. 8 is a flow diagram illustrating a remediate routine invoked by the security system in some embodiments.

FIG. 8 is a flow diagram illustrating a remediate routine invoked by the security system in some embodiments. The routine 800 begins at block 802. At block 804, the routine receives a set of remediation actions. As an example, the routine may receive a set of remediation actions that are emitted by a remediation calculator. At block 806, the routine identifies the next provider indicated by the remediation actions. At decision block 808, the routine determines whether a provider was identified. As an example, when all remediation actions have been processed, no provider may be identifiable. If no provider was identified, the routine continues at block 814, where it returns. Otherwise, when a provider was identified, the routine continues at block 810. At block 810, the routine remediates using the identified provider. As an example, the routine may invoke the provider interface to provide an action to the identified provider. The routine may cause the identified provider to bring the OS component associated with the identified provider into compliance. At block 812, the routine adds results provided by the identified provider to a remediation results report. The routine then continues at block 806.

Figure 9:
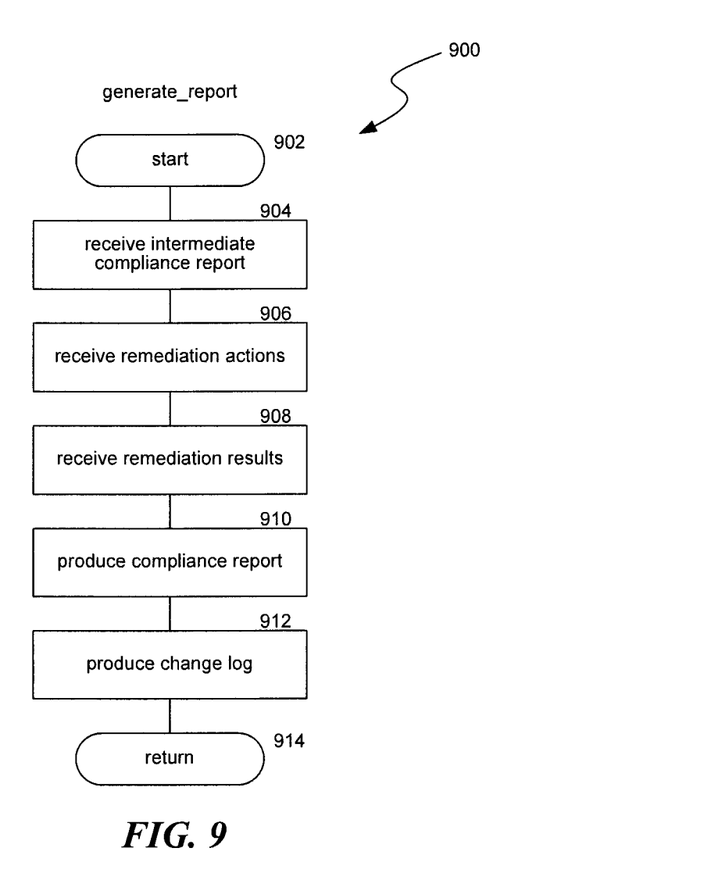
FIG. 9 is a flow diagram illustrating a generate_report routine invoked by the security system in some embodiments.

FIG. 9 is a flow diagram illustrating a generate_report routine invoked by the security system in some embodiments. The routine 900 may be invoked by a report generator component to generate a report. The routine begins at block 902. At block 904, the routine receives an intermediate compliance report, such as an intermediate compliance report generated by a compliance evaluator component. At block 906, the routine receives a set of remediation actions, such as remediation actions generated by a remediation calculator component. At block 908, the routine receives remediation results, such as remediation results generated by a remediator component after providing the remediation actions to provider components. At block 910, the routine produces a compliance report. At block 912, the routine produces a change log. At block 914, the routine returns.

Examples of compliance documents will now be provided. Table 1 illustrates portions of a registry compliance document.

TABLE 1

```
<AppInstallCheck id="CheckForAntiVirusSoftware">
    <Check description="Check if the necessary anti-virus software is installed" severity="1">
        <Product Name="VirusChecker" Vendor="Software Company">
            <InstallPath>%ProgramFiles%\SoftwareCompany\VirusChecker</InstallPath>
            <Version major="2" minor="7" versionmatch="Exact">
        </Product>
    </Check>
    <Remediation description="Go to product site to install virus checker" waitforuserconsent="no"
    rebootrequired="maybe">
        <FixLocation>http://www.softwarecompany.org/viruschecker/install</FixLocation>
    </Remediation>
</AppInstallCheck>
<AntiVirusCheck id="CheckForAVSignatureUpdateStatus">
    <Check description="Check if AV signatures are up to date" severity="1">
        <SignaturesUptoDate graceperiod="0">True</SignaturesUptoDate>
    </Check>
    <Remediation description="Run AV update program to update signatures" waitforuserconsent="no"
    rebootrequired="no">
        <Command>%ProgramFiles\SoftwareCompany\VirusChecker\updatesigs.exe</Command>
    </Remediation>
</AntiVirusCheck>
<AppInstallCheck id="CheckForAntiSpyware">
    <Check description="Check if the necessary anti-spyware software is installed" severity="1">
        <Product Name="Windows Defender" Vendor="Microsoft Corp.">
            <InstallPath>%ProgramFiles%\Windows Defender</InstallPath>
            <Version major="6" minor="0" versionmatch="Minimum">
        </Product>
    </Check>
    <Remediation description="Go to product site to install Windows Defender" waitforuserconsent="no"
    rebootrequired="maybe">
        <FixLocation>http://www.microsoft.com/security</FixLocation>
    </Remediation>
</AppInstallCheck>
<AntiVirusCheck id="CheckForASSignatureUpdateStatus">
    <Check description="Check if Anti-Spyware signatures are up to date" severity="1">
        <SignaturesUptoDate graceperiod="2">True</SignaturesUptoDate>
    </Check>
    <Remediation description="Update Defender signatures through Windows Update" waitforuserconsent="no"
    rebootrequired="no">
        <Command>WindowsUpdate product="Windows Defender" version="1.1.1505"</Command>
    </Remediation>
</AntiVirusCheck>
```

The example compliance document illustrated in Table 1 describes compliance and remediation actions for two providers: an anti-virus provider and an anti-spyware provider. The following describes elements of the example compliance document, though other elements are also possible. The security system may determine whether the computer system's registry complies with security policies described by the example compliance document and may take specified remediation actions. According to the example compliance document, each provider has a header element and a footer element. The header element can specify a type of provider. As examples, provider header 1 specifies "anti-virus" and provider header 2 specifies "anti-spyware." Each provider can include elements, such as elements relating to installation configuration, process state configuration, and signature version configuration. The installation configuration element associated with the anti-virus provider indicates that the security system is to check whether version 7.1 of a software product named "VirusChecker" that is produced by "Software Company" is installed. The process state configuration element indicates to check that the process is running. When the process is not running, the remediation action is to issue a "sc start viruschecker" command that starts the viruschecker service. The signature version configuration checks the digital signature on executable files that provide the viruschecker service to ensure that the signature version is 23.73.107. If the computer system does not have that version of the executable files, the remediation action indicates to copy files from a specified location. The compliance document may not have all of the illustrated elements or may have other elements.

Although the example compliance document illustrated in Table 1 indicates two providers, additional providers can also be indicated.

In some embodiments, the security system may provide a "PerformComplianceScan" method that receives the location of a compliance document, the location at which to store a compliance report, and the location of a log (e.g., change log). When invoked, the method may check compliance of a computer system and remediate its configuration state based on the compliance document. The method may also generate a compliance report and add indications of configuration changes to the log. In some embodiments, the method additionally receives an identifier of a computer system so that the identified computer system can be analyzed and remediated. In some embodiments, the method may check compliance but not perform remediation.

In some embodiments, the security system may provide a "PerformRemediation" method that can accept parameters that are similar to the parameters accepted by the "PerformComplianceScan" method. This method may remediate computer systems based on remediation actions specified in the compliance document.

A provider interface component may provide the "PerformComplianceScan" and "Perform Remediation" methods as a part of its API. A provider component may provide an "ExecuteChecks" method and a "PerformRemediation" method.

The "ExecuteChecks" method may receive a set of "check" elements from a compliance document and may provide a set of results corresponding to the indicated check criteria. When invoked, the "ExecuteChecks" method may check associated OS components. The "PerformRemediation" method may receive a set of remediation actions and may cause associated OS components to change their configuration accordingly.

In some embodiments, the security system may recommend remediation actions. As an example, an XCCDF or a compliance document specified in a non-native document format may indicate security policies or compliance criteria, but not specify remediation actions. The security system may be able to recommend remediation actions based on the security policies or compliance criteria.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a first computer system for causing an analyzed computer system to comply with a security policy, comprising:
    receiving an identifier of a second computer system to be analyzed;
    receiving, from a compliance application running under a user account, via a common provider interface, an indication to check compliance of the second computer system;
    receiving a compliance document, the compliance document indicating a compliance criterion;
    determining whether the compliance document is compatible with an analyzing method;
    if the compliance document is compatible with the analyzing method, determining whether the second computer system satisfies the compliance criterion even through the user account does not have sufficient privileges to determine whether the second computer system satisfies the compliance criterion;
    if the second computer system does not satisfy the compliance criterion, computing a remediation action based on a difference between the compliance document and an intermediate compliance report and programmatically causing, without user action, the second computer system to undertake the remediation action so that the second computer system complies with the security policy, wherein the intermediate compliance report indicates which compliance criteria specified in the compliance document are not satisfied, wherein the remediation action is applied by employing a higher security privilege than a security privilege employed by a user of the computing system; and
    compiling remediation results indicating whether the remediation was successful.

2. The method of claim 1 further comprising generating a compliance report indicating an operating system component that caused the compliance criterion not to be satisfied.

3. The method of claim 1 further comprising generating a change log indicating a configuration state change made to the second computer system by undertaking the remediation action.

4. The method of claim 1 further comprising receiving via a common provider interface an indication to check compliance of the second computer system and invoking a method of a provider component to check compliance wherein the provider component is associated with an operating system component whose compliance is to be checked.

5. The method of claim 1 further comprising receiving via a common provider interface an indication to remediate the second computer system and invoking a method of a provider component to remediate wherein the provider component is associated with an operating system component that undergoes a remediation action.

6. The method of claim 1 further comprising receiving via a common provider interface an indication to remediate the second computer system.

7. The method of claim 1 further comprising converting the compliance document from a XCCDF format to a native format and recommending a remediation action based on a compliance criterion specified in the XCCDF document.

8. A computer-readable storage device storing computer-executable instructions that, when executed, cause a first computer system to perform a method for causing an analyzed computer system to comply with a security policy, the method comprising:
    receiving an identifier of a second computer system to be analyzed;
    receiving, at a compliance evaluator component from a compliance application running under a user account, an indication to check compliance of the second computer system, the user account lacking sufficient privileges to perform the check;
    receiving a compliance template, the compliance template having multiple compliance documents, at least one of the compliance documents indicating a compliance criterion and a remediation action;
    determining whether the compliance documents are compatible with an analyzing method;
    if the compliance documents are compatible with the analyzing method:
        providing the compliance criterion to a first provider component, the first provider component associated with a first operating system component of the second computer system and exposing a first programming interface;
        determining, by the compliance evaluator component based on a report from the first provider component, whether the first operating system component of the second computer system satisfies the compliance criterion;
        if the compliance criterion is not satisfied, programmatically without user action, performing the remediation action, wherein the remediation action is applied by employing a higher security privilege than a security privilege employed by a user of the computing system; and
        compiling remediation results indicating whether the remediation was successful.

9. The computer-readable storage device of claim 8 further comprising instructions for causing the first operating system component to undergo a remediation action when the compliance criterion is not satisfied wherein the compliance criterion is specified using a human-readable language.

10. The computer-readable storage device of claim 8 further comprising instructions for determining whether a third computer system different from the first computer system and second computer system complies with the security policy.

11. The computer-readable storage device of claim 8 wherein the first programming interface is common to a second provider component, and wherein the second provider component is associated with a second operating system component, and wherein the first provider component and the second provider component are not the same provider component.

12. The computer-readable storage device of claim 11 further comprising instructions for providing a second compliance criterion to the second provider component, receiving from the second provider component an indication of whether the second compliance criterion is satisfied, and generating a compliance report indicating both whether the compliance criterion is satisfied and whether the second compliance criterion is satisfied.

13. The computer-readable storage device of claim 8 further comprising instructions for generating a compliance document.

14. The computer-readable storage device of claim 11 wherein when the compliance criterion is not satisfied, employing the programming interface of the second provider component to cause the second operating system component to undergo a remediation action specified in the compliance document indicating the remediation action.

15. A system for causing an analyzed computer system to analyze or comply with a security policy, comprising:

a processor and memory;

a first provider component stored in the memory and associated with a first operating system component executed by the processor;

a second provider component stored in the memory and associated with a second operating system component;

a compliance evaluator component, using a common provider interface component stored in the memory, that receives a compliance criterion indicated in a compliance document received from a compliance application running under a user account, the user account lacking sufficient privileges to perform a compliance check, the compliance document specifying at least a portion of a security policy, and determines if the compliance document is compatible with the analyzed computer system, and if so, determines, based on a report from one or more of the first and second provider components, whether the first and second operating system components satisfy the compliance criterion; and a remediation calculator component stored in the memory that identifies a remediation action that the first operating system component is to undergo to place the computer system in compliance with the portion of the security policy, and compiles remediation results indicating whether the remediation was successful, wherein the remediation action is specified in a human-readable language and programmatically without user action causes the first operating system to be placed in compliance, wherein the remediation action is applied by employing a higher security privilege than a security privilege employed by a user of the computing system.

16. The system of claim 15 further comprising a remediation calculator component that identifies a remediation action that the second operating system component is to undergo to place the computer system in compliance with the portion of the security policy and a remediator component that provides the identified remediation action to the second operating system component.

17. The system of claim 15 further comprising a remediation calculator component that identifies a remediation action that a specified operating system component is to undergo to place the computer system in compliance with the portion of the security policy, a remediator component that provides the identified remediation action to the specified operating system component, and a report generator component that generates a compliance report that indicates whether the compliance criterion is satisfied.

18. The system of claim 15 wherein the first provider component exposes a first programming interface, and wherein the second provider component exposes a second programming interface that is different from the first provider interface, and wherein the compliance evaluator component generates the report from the first and second provider components by:

employing the first programming interface to determine whether the first operating system component satisfies the compliance criterion if the compliance criterion identifies the first operating system component, and employing the second programming interface to determine whether the second operating system component satisfies the compliance criterion if the compliance criterion identifies the second operating system component.

* * * * *